United States Patent
Urisaka

(10) Patent No.: US 8,089,524 B2
(45) Date of Patent: Jan. 3, 2012

(54) FLICKER CORRECTION APPARATUS, FLICKER CORRECTION METHOD, AND IMAGE SENSING APPARATUS

(75) Inventor: Shinya Urisaka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 648 days.

(21) Appl. No.: 12/270,163

(22) Filed: Nov. 13, 2008

(65) Prior Publication Data

US 2009/0135276 A1    May 28, 2009

(30) Foreign Application Priority Data

Nov. 27, 2007  (JP) .................................. 2007-306309

(51) Int. Cl.
*H04N 5/228* (2006.01)
(52) U.S. Cl. .................................. 348/222.1; 348/226.1
(58) Field of Classification Search .............. 348/222.1, 348/226.1, 227.1, 228.1, 234.1
See application file for complete search history.

(56) References Cited

U.S. PATENT DOCUMENTS 6,710,818 B1    3/2004   Kasahara et al.
7,656,436 B2 *  2/2010   Kinoshita et al. .......... 348/226.1

FOREIGN PATENT DOCUMENTS

JP    2000-023040    1/2000
JP       3823314     9/2006

* cited by examiner

*Primary Examiner* — Hung Dang
(74) *Attorney, Agent, or Firm* — Cowan, Liebowitz & Latman, P.C.

(57) ABSTRACT

A flicker detection region in which an image signal has values relating to luminance and colors within predetermined ranges is extracted from a plurality of flicker detection regions allocated in the vertical and horizontal directions of an image. A flicker component is detected using the luminance information of the image signal in the extracted flicker detection region. A correction value to correct the flicker component is generated from the detected flicker component. This makes it possible to accurately correct, using a simple arrangement, a flicker component contained in an image sensed under a light source whose brightness periodically changes even when the object or the image sensing apparatus moves.

10 Claims, 6 Drawing Sheets

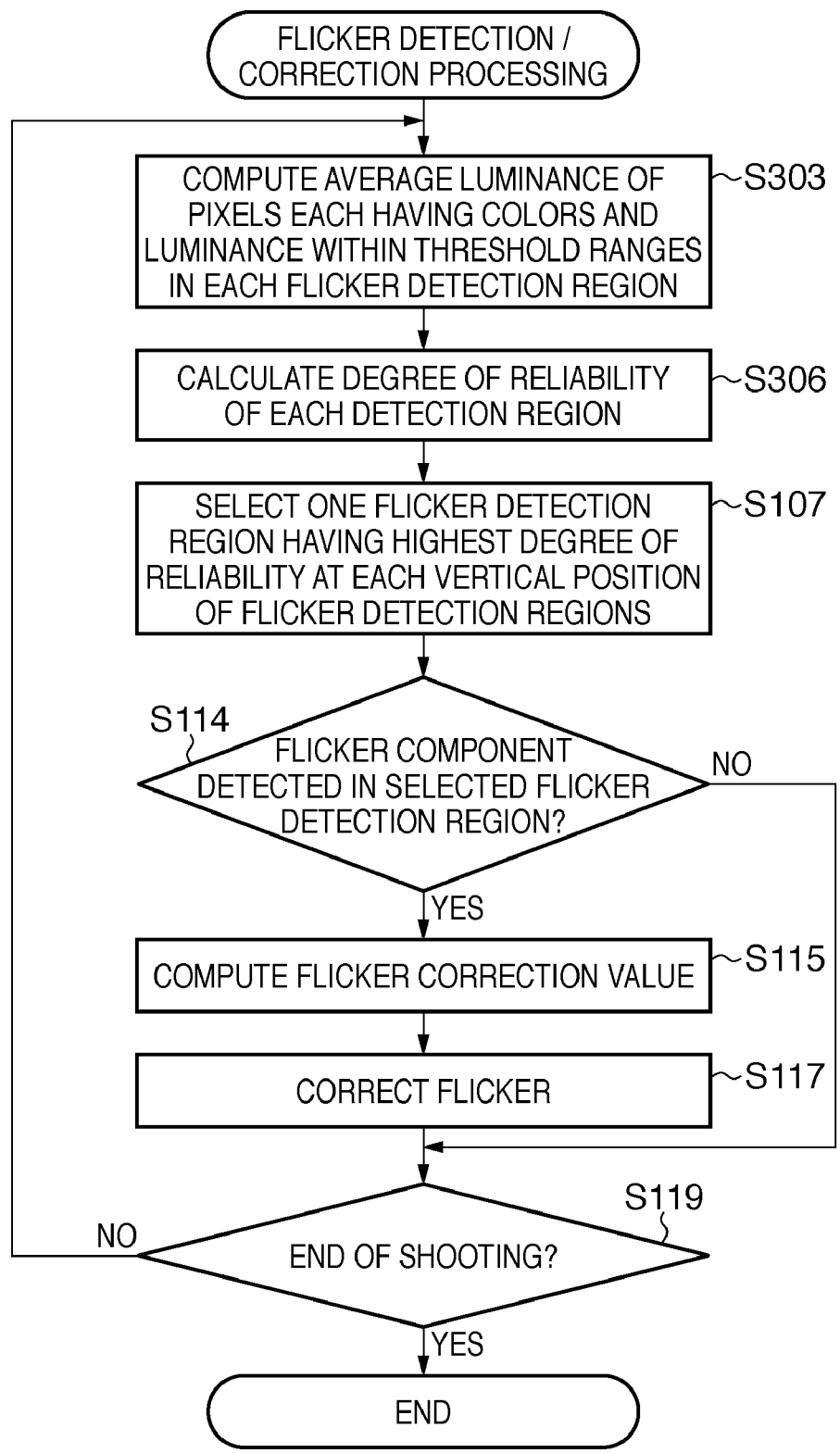

FLICKER CORRECTION APPARATUS, FLICKER CORRECTION METHOD, AND IMAGE SENSING APPARATUS

BACKGROUND OF THE INVENTION

1. Field of the Invention

The present invention relates to a flicker correction apparatus and flicker correction method, and more particularly, to a flicker correction apparatus and flicker correction method which correct a flicker component contained in an image sensed under a light source whose brightness periodically changes.

2. Description of the Related Art

Conventionally, an image sensing apparatus using a solid-state image sensor of X-Y addressing type, such as a CMOS image sensor, is commercially available. When shooting is performed using such an image sensing apparatus under the illumination of, for example, a fluorescent lamp or tungsten-filament lamp whose brightness varies in synchronization with the power supply frequency, the sensed image may have periodical bright and dark patterns in the vertical direction. This phenomenon, which is called flicker, occurs due to the difference between the commercial power supply frequency and the vertical sync frequency of the image sensing apparatus.

A method of suppressing such flicker is known, in which if the power supply frequency is, for example, 50 Hz, the shutter speed is fixed at $1/100$ sec, thereby uniforming the exposure light amount in the lines and frames. However, since the shutter speed is fixed in this method, the degree of freedom of exposure control decreases.

Japanese Patent Laid-Open No. 2000-23040 discloses an image sensing apparatus which suppresses flicker by causing a photometric element provided independently of an image sensor to measure the flicker waveform of a fluorescent lamp and controlling the gain of a video signal output from the image sensor based on the flicker waveform.

Japanese Patent No. 3823314 discloses an image sensing signal processing apparatus which allocates a plurality of flicker detection regions by dividing an image in the direction of vertical scanning lines, detects luminance in each detection region, and calculates the luminance data difference between two preceding and succeeding frames in each detection region, thereby extracting and correcting flicker components.

However, the image sensing apparatus described in Japanese Patent Laid-Open No. 2000-23040 needs to have the photometric element for flicker detection in addition to the CMOS image sensor. In the flicker detection method described in Japanese Patent No. 3823314, if the object or camera moves, it is difficult to discriminate between the motion component and the flicker component in the sensed image, resulting in a decrease in the flicker detection accuracy and the flicker correction accuracy. Additionally, the sensed image may contain color information inappropriate for flicker detection. The flicker correction accuracy degrades in such an image.

SUMMARY OF THE INVENTION

The present invention has been made in consideration of the above-described problems of the prior arts. It is an object of the present invention to provide a flicker correction apparatus and flicker correction method which accurately corrects, using a simple arrangement, a flicker component contained in an image sensed under a light source whose brightness periodically changes.

According to one aspect of the present invention, there is provided a flicker correction apparatus for correcting a flicker component in an image signal obtained by an image sensor, comprising: an allocation unit which allocates a plurality of flicker detection regions by dividing the image signal of one frame in a vertical direction and a horizontal direction; an extraction unit which extracts a flicker detection region from the plurality of flicker detection regions, in which the included image signal has values relating to luminance and colors within predetermined ranges; a detection unit which detects a flicker component using luminance information of the image signal in the flicker detection region extracted by the extraction unit; a generation unit which generates, from the flicker component detected by the detection unit, a correction value to correct the flicker component; and a correction unit which corrects the flicker component by applying the correction value generated by the generation unit to the image signal of the one frame.

According to another aspect of the present invention, there is provided an image sensing apparatus comprising: an image sensor; a lens which forms an object image on the image sensor; a signal processing unit which reads out an image signal from the image sensor and performing signal processing for the readout image signal; a flicker correction apparatus of the present invention, which corrects a flicker component in the image signal output from the signal processing unit.

According to still another aspect of the present invention, there is provided a flicker correction method of correcting a flicker component in an image signal obtained by an image sensor, comprising the steps of: allocating a plurality of flicker detection regions by dividing the image signal of one frame in a vertical direction and a horizontal direction; extracting a flicker detection region from the plurality of flicker detection regions, in which the included image signal has values relating to luminance and colors within predetermined ranges; detecting a flicker component using luminance information of the image signal in the flicker detection region extracted in the extracting step; generating, from the flicker component detected in the detecting step, a correction value to correct the flicker component; and correcting the flicker component by applying the correction value generated in the generating step to the image signal of the one frame.

Further features of the present invention will become apparent from the following description of exemplary embodiments with reference to the attached drawings.

BRIEF DESCRIPTION OF THE DRAWINGS

FIG. 7 is a flowchart illustrating the procedure of flicker detection/correction processing in an image sensing apparatus according to the third embodiment of the present invention.

DESCRIPTION OF THE EMBODIMENTS

Preferred embodiments of the present invention will now be described in detail in accordance with the accompanying drawings.

First Embodiment

Figure 1:
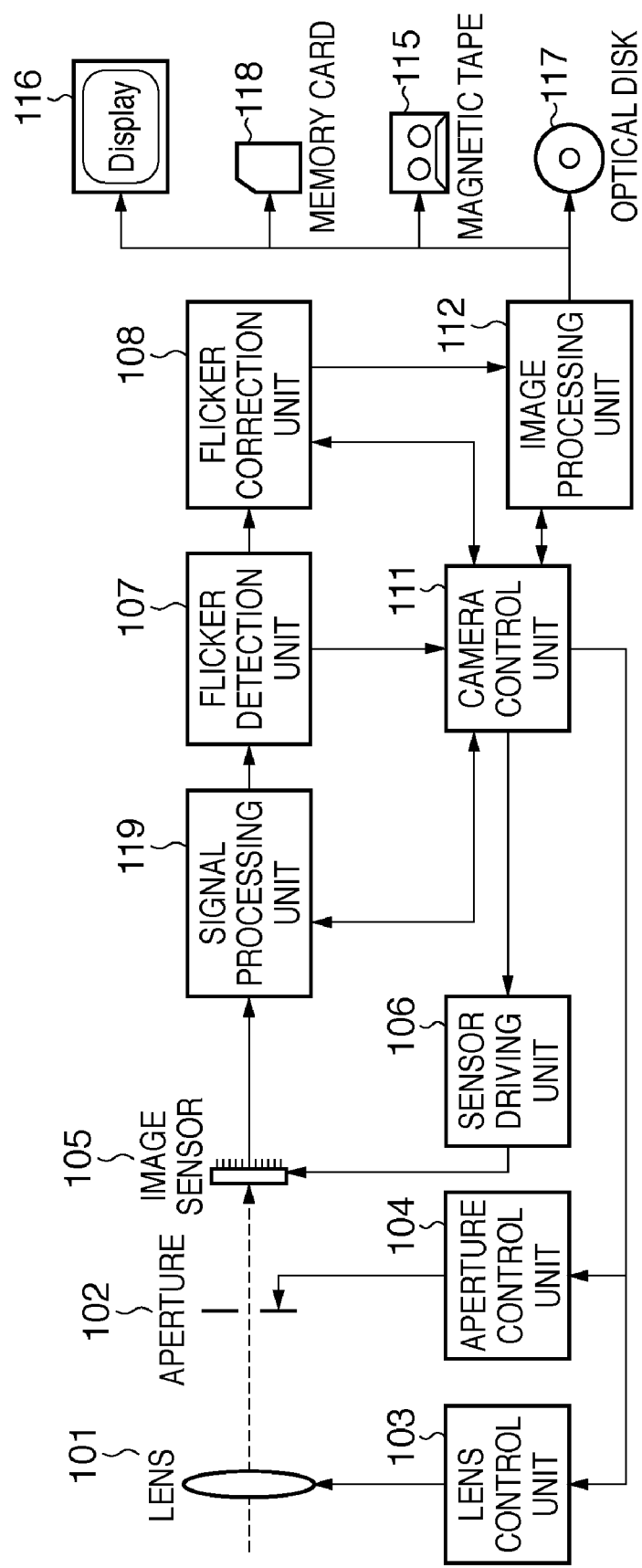
FIG. 1 is a block diagram showing an example of the arrangement of an image sensing apparatus which is an example of a flicker correction apparatus according to an embodiment of the present invention.

FIG. 1 is a block diagram showing an example of the arrangement of an image sensing apparatus which is an example of a flicker correction apparatus according to the first embodiment of the present invention.

Reference numeral 101 denotes a lens. An aperture 102 is arranged on the rear side of the lens 101. Light which enters via the lens 101 and the aperture 102 forms an object image on the imaging plane of an image sensor 105. The image sensor 105 is, for example, a CMOS image sensor of X-Y addressing type, which converts the formed object image into an image signal of each pixel.

A signal processing unit 119 performs signal processing such as defect pixel correction, A/D conversion, and color interpolation processing for the image signal converted by the image sensor 105, thereby generating image data (CCD-RAW data: to be simply referred to as RAW data hereinafter).

A flicker detection unit 107 detects whether the RAW data output from the signal processing unit 119 contains a flicker component. If the RAW data contains a flicker component, a flicker correction unit 108 applies flicker correction processing based on detection data obtained by the flicker detection unit 107 to the RAW data. The flicker detection and flicker correction processing by the flicker detection unit 107 and the flicker correction unit 108 will be described later in detail.

If the flicker detection unit 107 detects no flicker component from the RAW data, the flicker correction unit 108 outputs the RAW data without applying flicker correction processing.

An image processing unit 112 applies, to the RAW data output from the flicker correction unit 108, image processing corresponding to so-called development processing such as white balance processing, edge enhancement processing, and gamma correction processing, thereby converting the RAW data into image data. The image processing unit 112 also applies predetermined processing corresponding to the output device, such as encoding processing, to the image data. The image data output from the image processing unit 112 is displayed on a display 116 or recorded on a magnetic tape 115, optical disk 117, or memory card 118.

A camera control unit 111 is, for example, a microcomputer which controls the units of the image sensing apparatus and implements its various operations by executing a control program stored in an internal memory (not shown).

The camera control unit 111 controls charge accumulation and readout of the image sensor 105 via a sensor driving unit 106. The camera control unit 111 also controls focus and zoom of the lens 101 via a lens control unit 103.

The camera control unit 111 also performs exposure control by controlling the shutter (not shown) and the aperture 102 via an aperture control unit 104 based on the luminance information of the object obtained from the image data acquired from the image sensor 105.

The camera control unit 111 also performs camera shake correction processing by driving some lenses of the lens 101 via the lens control unit 103 or driving the image sensor 105 via the sensor driving unit 106.

The camera control unit 111 also controls the above-described flicker component detection and flicker component correction processing by controlling the flicker detection unit 107 or flicker correction unit 108.

Figure 2:
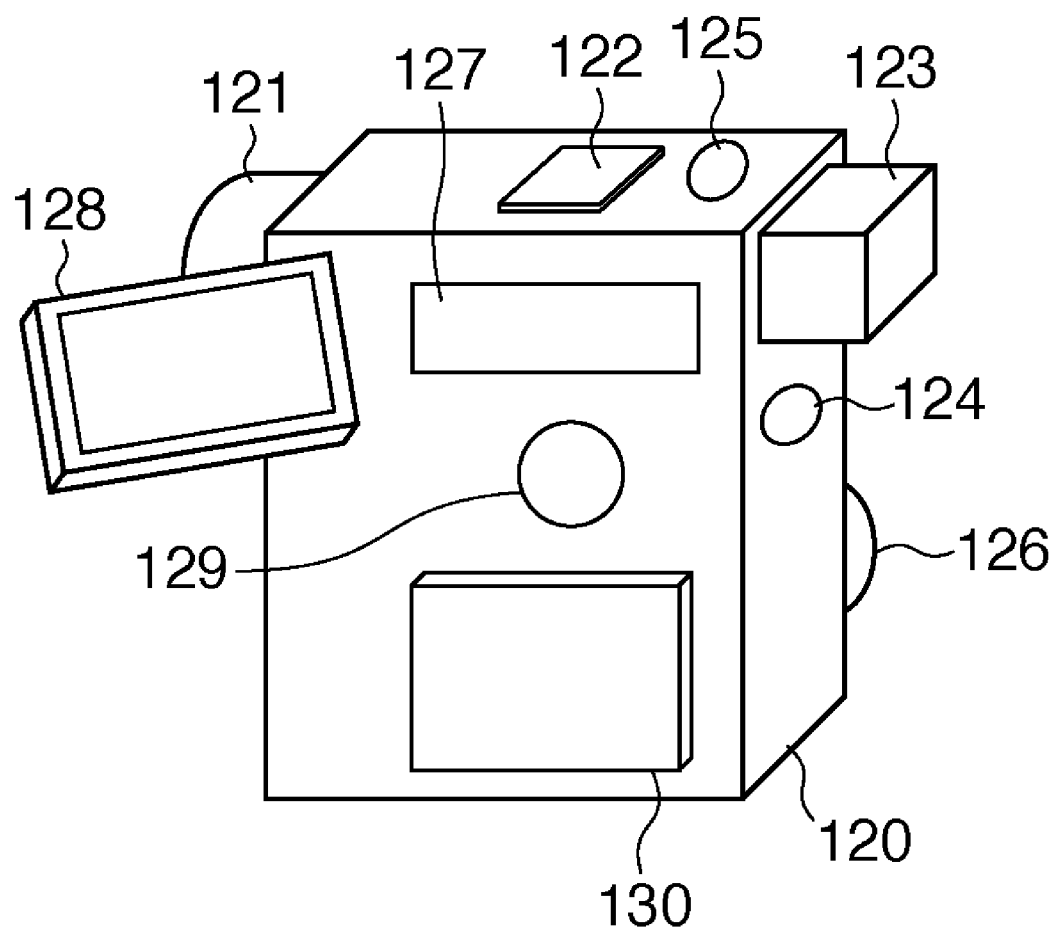
FIG. 2 is a perspective view showing an example of the outer appearance of the image sensing apparatus according to the embodiment of the present invention.

FIG. 2 is a perspective view showing an example of the outer appearance of the image sensing apparatus according to this embodiment.

Reference numeral 120 denotes a main body of the image sensing apparatus. The main body 120 incorporates or detachably includes a recording medium such as an optical disk, magnetic tape, or memory card so that a sensed moving image or still image can be recorded on the recording medium or played back from the recording medium. Reference numeral 121 denotes a lens unit; 122, a microphone which records voice upon shooting; and 123, an electronic viewfinder (EVF).

A moving image sensing trigger switch 124 is a push button. The user operates it to instruct the image sensing apparatus to start or end moving image sensing. A still image sensing trigger switch 125 is a push button. The user operates it to instruct the image sensing apparatus to start or end still image sensing.

The operator uses a mode dial 126 formed from a rotary switch to set the operation mode of the image sensing apparatus. As the operation mode, the mode dial 126 of this embodiment can select "play" to set a playback mode, "camera" to set a camera mode, or "OFF" of neither case.

An operation switch group 127 includes keys to be used by the operator to input a white balance control mode or exposure control mode to the image sensing apparatus, and keys for other menu operations and playback system operations.

A display device 128 is a flat display panel which is attached to a side surface of the main body 120 to freely open and close. Like the EVF 123, the display device 128 is used manly to confirm an object image in the camera mode or display a playback image in the playback mode. The display device 128 that is open from the main body 120 can rotate about an axis vertically extending from the main body 120.

A speaker 129 is provided to output voice in a moving image playback mode. A battery 130 is detachable from the main body 120.

(Flicker Detection and Flicker Correction Processing)

The flicker detection processing and flicker correction processing executed by the flicker detection unit 107 and the flicker correction unit 108 according to this embodiment will be described next with reference to the flowchart in FIG. 3.

Figure 3:
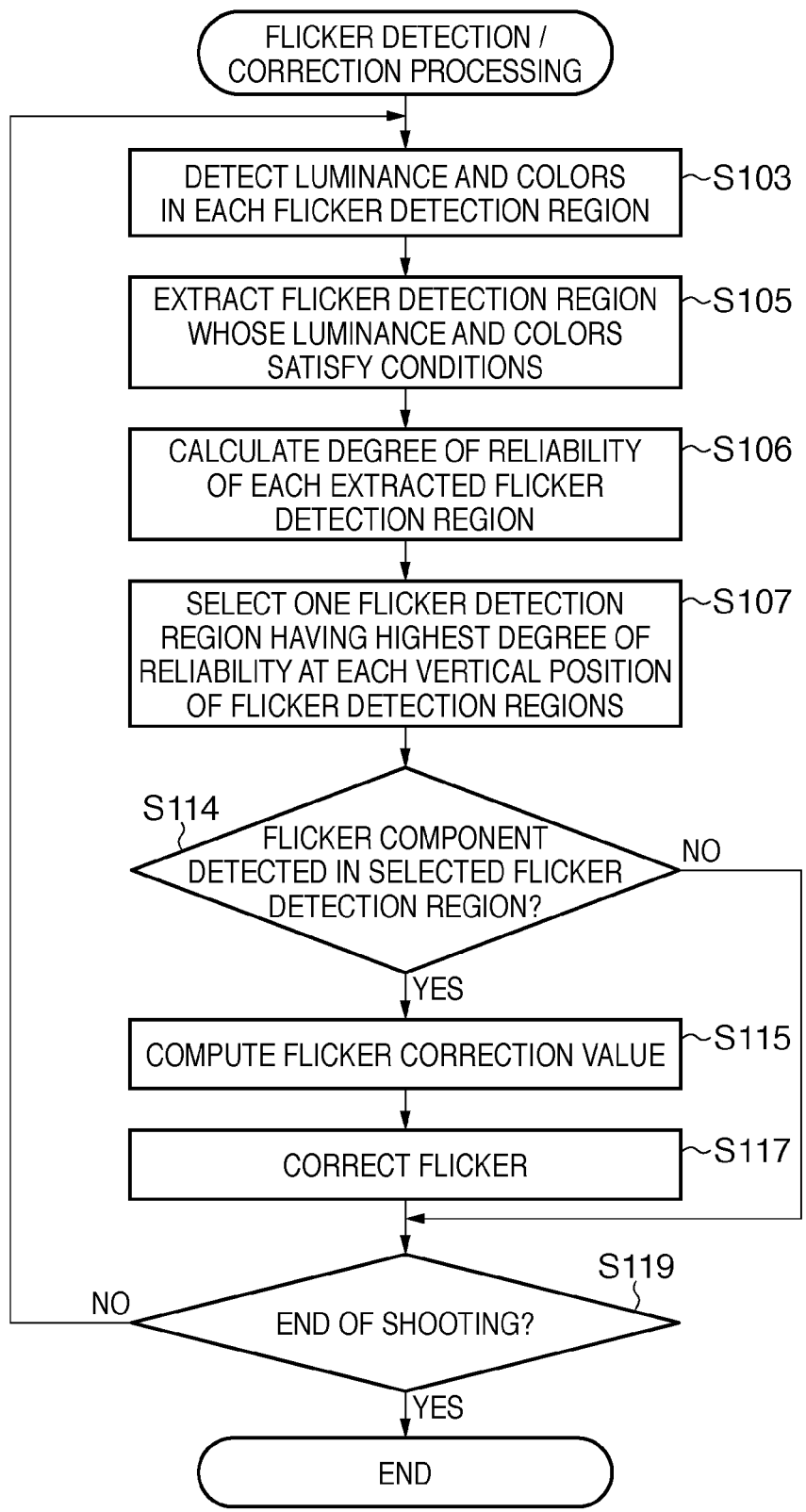
FIG. 3 is a flowchart illustrating the procedure of flicker detection/correction processing in the image sensing apparatus according to the first embodiment of the present invention.

FIG. 3 is a flowchart illustrating the procedure of flicker detection/correction processing in the image sensing apparatus according to this embodiment.

First, the flicker detection unit 107 divides RAW data of one frame generated by the signal processing unit 119 into a plurality of parts in the horizontal and vertical directions, thereby allocating flicker detection regions. The flicker detection unit 107 detects the luminance component and color components of the image data in each allocated flicker detection region (S103).

Figure 4:
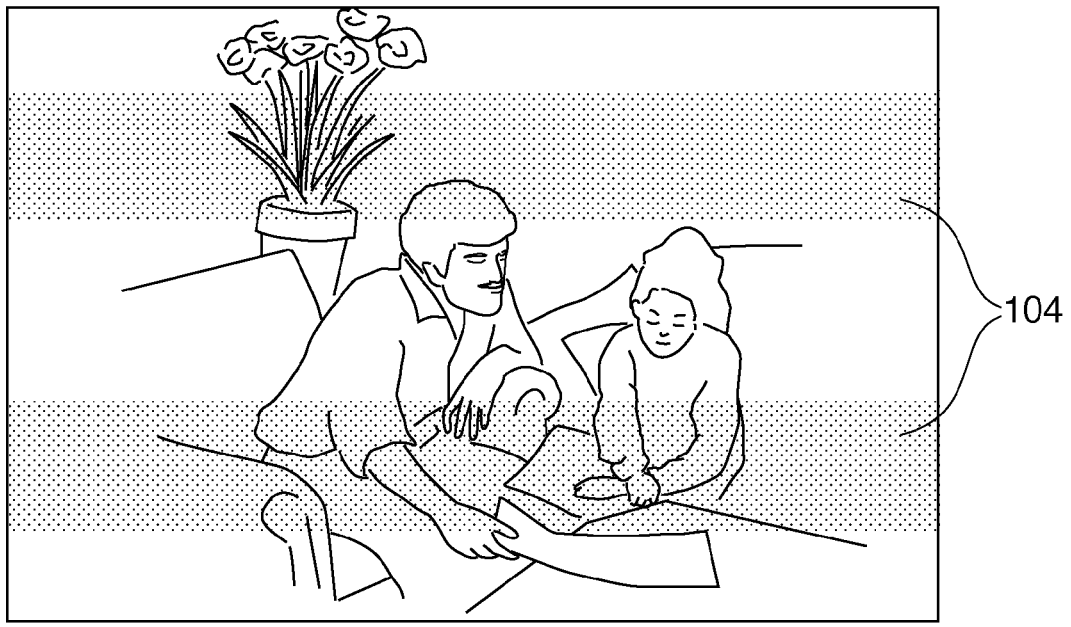
FIG. 4 is a view schematically showing lateral-striped flicker generated in an image sensed under a fluorescent lamp by an image sensing apparatus using an image sensor of X-Y addressing type.

FIG. 4 is a view schematically showing lateral-striped flicker generated in an image sensed under a fluorescent lamp by an image sensing apparatus using an image sensor of X-Y addressing type, such as a CMOS image sensor.

If image data contains flicker components, the luminance value varies in the vertical direction, and lateral-striped unevenness luminance occurs, as indicated by 140, even when the object has a uniform luminance value at any point in the frame.

Figure 5:
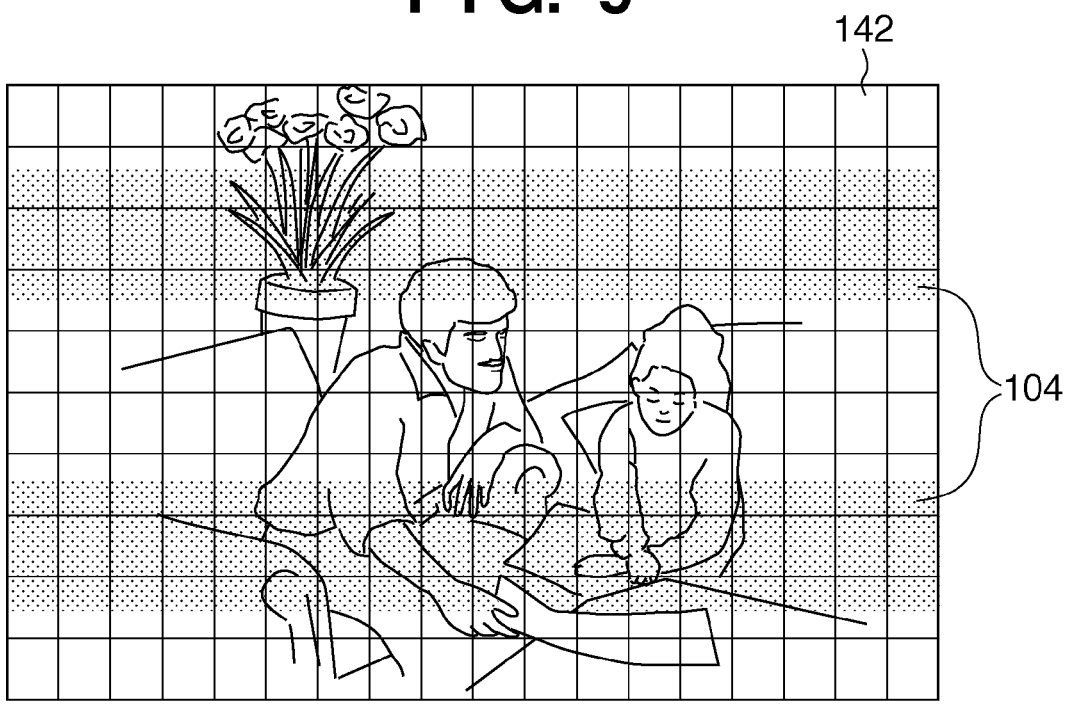
FIG. 5 is a view showing an example of flicker detection regions allocated by the flicker detection unit of the image sensing apparatus according to the embodiment of the present invention.

FIG. 5 is a view showing an example of flicker detection regions allocated by the flicker detection unit 107. In the example shown in FIG. 5, 18 (columns)×10 (rows) flicker detection regions are allocated in one frame. Note that the flicker detection regions need not always be allocated all over the frame.

RAW data of one frame is divided into a plurality of parts in the horizontal and vertical directions to allocate a plurality of flicker detection regions 142. Values relating to luminance and colors are obtained in each flicker detection region. In this embodiment, as examples of the values relating to luminance and colors, the average luminance value and the average color difference value of pixels included in each flicker detection region are obtained. This can be implemented by calculating the average value of each of R, G, and B color components of pixels included in a flicker detection region in the RAW data generated by the signal processing unit 119 and obtaining the luminance value and the color difference values from the average values of R, G, and B using a known transformation.

Next, the flicker detection unit 107 determines whether the average luminance value and the average color difference values obtained for each flicker detection region fall within preset threshold ranges, and extracts flicker detection regions in which the values satisfy the conditions (S105). The threshold ranges of the average luminance value and the average color difference values are set to include the luminance value and the color difference values corresponding to white in correct exposure, that is, white after white balance adjustment and exclude too bright (highlight detail loss) regions and too dark regions. Note that as the luminance value and the color difference values corresponding to white in correct exposure, for example, values obtained by the image processing unit 112 based on the image data of the immediately preceding frame are usable.

The flicker detection unit 107 calculates the degree of reliability concerning flicker detection for all flicker detection regions extracted in step S105, in which both the average luminance value and the average color difference values fall within the preset threshold ranges (S106). The degree of reliability concerning flicker detection is calculated using, as an evaluation value, one value or a plurality of weighted values of a temporal change of the image in a flicker detection region and the differences between white in correct exposure and the average luminance value and the average color difference values in the detection region.

The temporal change of an image in a flicker detection region is obtained by, for example, storing at least one of the image data of the preceding and succeeding frames in a memory (not shown) in the flicker detection unit 107 and comparing the image data with the image in a corresponding flicker detection region of the frame. The smaller the temporal change of the image in a flicker detection region is, the smaller the motion of the camera or object is regarded to be, and the higher the degree of reliability concerning flicker detection becomes. Additionally, in a flicker detection region whose average luminance value and average color difference values have small differences from white in correct exposure, the luminance value is considered to be correct and stable, and the degree of reliability becomes high.

In step S107, the flicker detection unit 107 selects one flicker detection region to be used for final flicker detection from each row (i.e., each vertical position) of the flicker detection regions. More specifically, the flicker detection unit 107 selects, from the flicker detection regions extracted in step S105, a flicker detection region having a highest degree of reliability obtained in step S106. If none of the flicker detection regions of one row have a predetermined degree of reliability, no flicker detection region is selected from the row.

Flicker generated in a frame is lateral striped, as shown in FIG. 4. For this reason, when at least one flicker detection region is selected in the horizontal direction, it is possible to detect the flicker component at the corresponding vertical position.

The flicker component detection accuracy is expected to rise by selecting a flicker detection region having a high degree of reliability. As a result, the accuracy of a flicker correction value and the flicker component removing accuracy are expected to be higher.

Next, the flicker detection unit 107 calculates the difference between the average luminance value in one flicker detection region selected from a row and the average value (time-rate average value) of the average luminance values of images in corresponding flicker detection regions of one or more frames continuous from the frame that is currently being processed. The flicker detection unit 107 determines on the basis of the magnitude of the difference whether a flicker component exists in the image in the selected flicker detection region (S114).

If the difference between the time-rate average value of the luminance in the selected flicker detection region and the luminance value in the current process frame has a predetermined value or more, it is determined that a flicker component exists.

If no flicker component is detected in any of the flicker detection regions selected in step S107, no flicker correction processing is performed.

On the other hand, if a flicker component is detected in at least one of the flicker detection regions, the camera control unit 111 computes a flicker correction value (S115). The flicker component is a luminance variation in the vertical direction. Since the luminance is constant in the horizontal direction, a predetermined flicker correction value is used for identical vertical positions independently of the horizontal position. The flicker correction value is obtained as a value for canceling the detected flicker component. For example, the reciprocal of the flicker component is obtained as a correction value for each pixel in the vertical direction.

The flicker correction value for a row (vertical position) where no flicker detection region is selected is obtained by interpolating flicker correction values computed for the flicker detection regions selected in the upper and lower rows. Next, the camera control unit 111 supplies the computed flicker correction values to the flicker correction unit 108. The flicker correction unit 108 performs flicker correction processing for the image data output from the flicker detection unit 107 (S117). The flicker correction unit 108 may be a multiplier which multiplies the reciprocal of a flicker component.

The output from the flicker correction unit 108 is supplied to the image processing unit 112 and undergoes signal processing necessary for display or recording, as described above.

After the above-described processing, the camera control unit 111 determines whether shooting is continuing (S119). The processing from step S103 is repeated until the end of shooting. Upon detecting the end of shooting, the camera control unit 111 ends the flicker detection and correction processing (S120).

As described above, according to this embodiment, a plurality of flicker detection regions are allocated to the image of one frame in the vertical and horizontal directions. Flicker components are detected using the luminance information of flicker detection regions in which values relating to luminance and colors of included pixels fall within predetermined threshold ranges. It is therefore possible to detect and remove flicker by only processing the image sensing signal without providing a special sensor for flicker detection as an image sensor.

The flicker detection accuracy can be further increased by using a flicker detection region having a high degree of reliability, such as a flicker detection region with a small image motion or a flicker detection region having a correct and stable image luminance value. It is consequently possible to improve the accuracy of a flicker correction value and the flicker removing accuracy.

Second Embodiment

The second embodiment of the present invention will be described next. The second embodiment is the same as the first embodiment except flicker detection and correction processing by a flicker detection unit 107 and a flicker correction unit 108.

The flicker detection and correction processing executed by the flicker detection unit 107 and the flicker correction unit 108 of the image sensing apparatus according to this embodiment will be described below with reference to the flowchart in FIG. 6.

Figure 6:
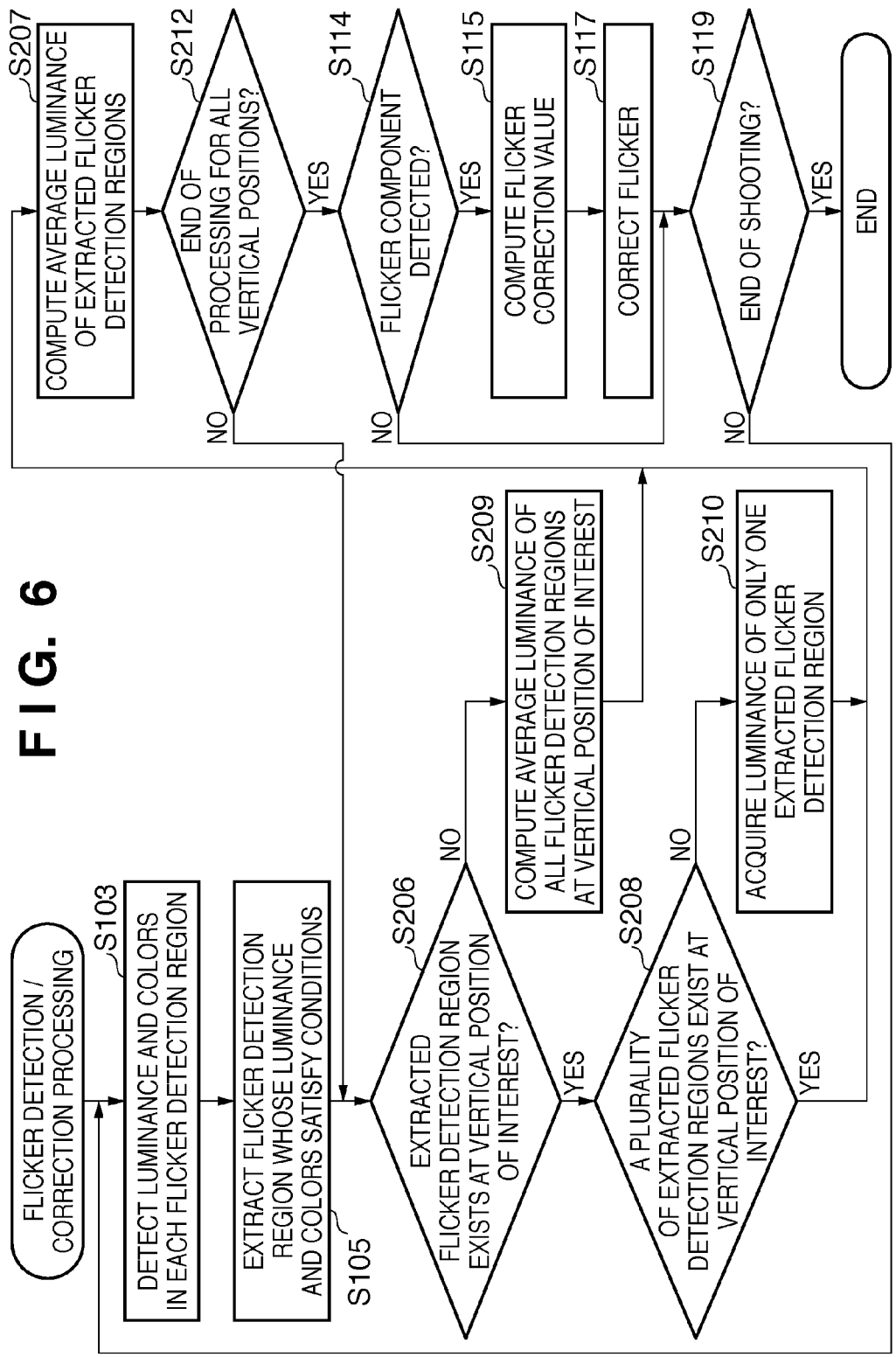
FIG. 6 is a flowchart illustrating the procedure of flicker detection/correction processing in an image sensing apparatus according to the second embodiment of the present invention.

The same step numbers as in FIG. 3 of the first embodiment denote the same operations in FIG. 6, and a description thereof will not be repeated.

As is apparent from comparison between FIGS. 6 and 3, the second embodiment is different in flicker detection region selection processing for each vertical position.

In step S105, the flicker detection unit 107 extracts flicker detection regions in which the average luminance value and the average color difference values fall within threshold ranges. Then, starting from step S206, a flicker detection region to be used for flicker detection is selected from each row (each vertical position) of the flicker detection regions.

First, the flicker detection unit 107 determines whether a flicker detection region extracted in step S105 exists at a given vertical position (e.g., in the uppermost row). If no extracted flicker detection region exists at the vertical position, the flicker detection unit 107 computes the average luminance value of the flicker detection regions included in the row as the luminance value at that vertical position (S209).

On the other hand, if a flicker detection region is extracted at the vertical position, the flicker detection unit 107 determines whether a plurality of flicker detection regions is extracted at the same vertical position (in the same row) (S208).

If only one flicker detection region is extracted at the same vertical position, the flicker detection unit 107 obtains the luminance value of the extracted flicker detection region as the luminance value at the vertical position of interest (S210).

On the other hand, if a plurality of flicker detection regions is extracted at the same vertical position, the flicker detection unit 107 computes the average value of the luminance values of the plurality of flicker detection regions as the luminance value at the vertical position of interest (S207).

In step S212, the flicker detection unit 107 determines whether the processing of obtaining the luminance values at all vertical positions is ended. The processing in steps S206 to S210 is repeated until the end of the processing of obtaining the luminance values at all vertical positions.

When the luminance values at all vertical positions are obtained, flicker component detection, correction value generation, and correction processing are continuously executed from step S114 in the same way as described in the first embodiment until the end of shooting.

In this embodiment, if no flicker detection region is extracted in step S105, flicker components are detected using the average luminance value of all flicker detection regions included in the row as the luminance value at the vertical position of interest in step S207. However, the luminance value at the vertical position may be obtained by interpolating luminance values at the vertical positions on the upper and lower sides of the vertical position of interest. Alternatively, if no flicker detection region is detected, flicker correction at the vertical position of interest may be inhibited.

In this embodiment, if a plurality of flicker detection regions is extracted at the same vertical position, flicker components are detected using the average value of the luminance values of the flicker detection regions as the luminance value at the vertical position of interest in step S209. However, as described in the first embodiment, the degree of reliability for flicker detection may be calculated for each of the plurality of extracted flicker detection regions, and a weighted average value corresponding to the degree of reliability may be used as the luminance value at the vertical position of interest.

As described above, according to this embodiment, a plurality of flicker detection regions are allocated by dividing an image in the horizontal and vertical directions. Flicker components are detected using the luminance data of flicker detection regions in which the average luminance value and the average color difference values fall within preset threshold ranges. It is therefore possible to detect and remove flicker by only processing the image sensing signal without providing a special sensor for flicker detection as an image sensor.

The method of computing the luminance value to be used to detect flicker components at a vertical position is changed in accordance with the number of flicker detection regions extracted at the same vertical position and having an average luminance value and average color difference values within preset threshold ranges. For this reason, a more accurate luminance value is obtained for a vertical position where a plurality of flicker detection regions is extracted. Even for a vertical position where no flicker detection region is extracted, a reliable luminance value can be obtained using a value generated by interpolating the luminance values at other vertical positions.

It is therefore possible to compute an appropriate luminance value corresponding to the number of extracted flicker detection regions as the luminance value at the vertical position of interest, resulting in an improvement of the flicker detection accuracy. Hence, even when a sensed image contains a number of regions with motion, it is possible to improve the accuracy of a flicker correction value and the flicker removing accuracy.

Third Embodiment

The third embodiment of the present invention will be described next. The third embodiment is the same as the first embodiment except flicker detection and correction processing by a flicker detection unit 107 and a flicker correction unit 108.

The flicker detection and correction processing executed by the flicker detection unit 107 and the flicker correction unit 108 of the image sensing apparatus according to this embodiment will be described below with reference to the flowchart in FIG. 7.

The same step numbers as in FIG. 3 of the first embodiment denote the same operations in FIG. 7, and a description thereof will not be repeated.

In step S303, the flicker detection unit 107 allocates flicker detection regions to RAW data of one frame output from a signal processing unit 119, as in the first embodiment. As the luminance value of each flicker detection region, the flicker detection unit computes the average luminance value of not all pixels in the region but pixels each having a luminance value and color difference values within preset threshold ranges. The thresholds can be the same as in the first embodiment.

Next, the flicker detection unit 107 calculates the degree of reliability for flicker detection in all flicker detection regions (S306). The degree of reliability can be calculated using one evaluation value or a plurality of weighted evaluation values of a temporal change of the image in a flicker detection region, the difference between the luminance value and a white point in the flicker detection region, and the number of pixels within the threshold ranges.

As in the first embodiment, the flicker detection unit 107 selects one flicker detection region to be used for flicker detection at each vertical position of the flicker detection regions (S107). Then, flicker component detection, correction value generation, and correction processing are continuously executed from step S114, as in the first embodiment. However, the third embodiment is different from the first embodiment in that the average luminance value of not all pixels in a region but pixels each having a luminance and color difference values within preset threshold ranges is used as the luminance value of the flicker detection region.

In this embodiment, when selecting a flicker detection region at each vertical position in step S107, a flicker detection region having a highest degree of reliability is selected from flicker detection regions at the same vertical position (same row), and the luminance value of the detection region is used as the luminance value at that vertical position. Instead, the average value of luminance data in the plurality of flicker detection regions at the same vertical position may be used as the luminance value at that vertical position.

Alternatively, the luminance values of all flicker detection regions at the same vertical position may be weighted and added in accordance with the degree of reliability of each flicker detection region to obtain the luminance value at that vertical position.

If the highest degree of reliability of the flicker detection region is lower than a predetermined degree of reliability, the average luminance of all flicker detection regions at the vertical position of interest may be used as the luminance value at that vertical position. A luminance value obtained by interpolating the luminance values of flicker detection regions selected at the vertical positions on the upper and lower sides of the vertical position of interest may be used as the luminance value at that vertical position. Alternatively, for a vertical position at which the highest degree of reliability of the flicker detection region is lower than a predetermined degree of reliability, flicker correction may be inhibited.

As described above, according to this embodiment, a plurality of flicker detection regions are allocated by dividing an image in the horizontal and vertical directions. Flicker components are detected using the luminance values of pixels each having a luminance value and color difference values within preset threshold ranges. It is therefore possible to detect and remove flicker by only processing the image sensing signal without providing a special sensor for flicker detection as an image sensor. The luminance value of each flicker detection region is obtained using not all pixels in the flicker detection region but only pixels each having a luminance value and color difference values within preset threshold ranges. This makes it possible to exclude pixels having a large change in the flicker detection region and accurately perform flicker correction.

Other Embodiments

In the above-described embodiments, color difference values are used as an example of the color data of a flicker detection region or a pixel. However, the values of any other form such as R, G, and B values are also usable, as a matter of course.

In the above-described embodiments, an image sensing apparatus has been exemplified as the flicker correction apparatus. However, the image sensing function and the recording function are not necessarily essential in the flicker detection and correction processing, as can easily be understood.

For this reason, the components shown in FIG. 1 except for the flicker detection unit 107, flicker correction unit 108, and camera control unit 111 are not indispensable in the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-306309, filed on Nov. 27, 2007, which is hereby incorporated by reference herein in its entirety.

What is claimed is:

1. A flicker correction apparatus for correcting a flicker component in an image signal obtained by an image sensor, comprising:
    an allocation unit which allocates a plurality of flicker detection regions by dividing the image signal of one frame in a vertical direction and a horizontal direction;
    an extraction unit which extracts a flicker detection region from the plurality of flicker detection regions, in which the included image signal has values relating to luminance and colors within predetermined ranges;
    a detection unit which detects a flicker component using luminance information of the image signal in the flicker detection region extracted by said extraction unit;
    a generation unit which generates, from the flicker component detected by said detection unit, a correction value to correct the flicker component; and
    a correction unit which corrects the flicker component by applying the correction value generated by said generation unit to the image signal of said one frame.

2. The apparatus according to claim 1, wherein the predetermined ranges include values relating to luminance and colors in correct exposure, which are obtained based on an image signal obtained by the image sensor before the image signal of said one frame.

3. The apparatus according to claim 1 further comprising a selection unit which selects a flicker detection region to be used to detect the flicker component from the flicker detection regions extracted by said extraction unit,
    wherein said detection unit detects the flicker component using luminance information of an image signal in the flicker detection region selected by said selection unit.

4. The apparatus according to claim 3, further comprising a computation unit which computes a degree of reliability concerning flicker detection for each of the flicker detection regions extracted by said extraction unit, wherein said selection unit selects a flicker detection region whose degree of reliability computed by said computation unit satisfies a predetermined degree of reliability.

5. The apparatus according to claim 4, wherein said selection unit selects a flicker detection region having a highest degree of reliability from the flicker detection regions extracted by said extraction unit which each position of the flicker detection regions in the vertical direction.

6. The apparatus according to claim 3, wherein if a plurality of flicker detection regions selected by said selection unit exist at the same position of the flicker detection regions in the vertical direction, said detection unit detects the flicker component using luminance information obtained from luminance information of the plurality of flicker detection regions.

7. The apparatus according to claim 3, wherein said detection unit detects the flicker component using, as luminance information to detect a flicker component at, out of positions of the flicker detection regions in the vertical direction, a position where no flicker detection region selected by said selection unit exists, luminance information obtained from luminance information of flicker detection regions selected by said selection unit at positions on upper and lower sides of the position where no flicker detection region selected by said selection unit exists.

8. The apparatus according to claim 3, wherein said detection unit detects the flicker component using, of the image signal included in the flicker detection region selected by said selection unit, luminance information of an image signal having values relating to luminance and colors within the predetermined ranges.

9. An image sensing apparatus comprising:
an image sensor;
a lens which forms an object image on said image sensor;
a signal processing unit which reads out an image signal from said image sensor and performing signal processing for the readout image signal;
a flicker correction apparatus of claim 1, which corrects a flicker component in the image signal output from said signal processing unit.

10. A flicker correction method of correcting a flicker component in an image signal obtained by an image sensor, comprising the steps of:
allocating a plurality of flicker detection regions by dividing the image signal of one frame in a vertical direction and a horizontal direction;
extracting a flicker detection region from the plurality of flicker detection regions, in which the included image signal has values relating to luminance and colors within predetermined ranges;
detecting a flicker component using luminance information of the image signal in the flicker detection region extracted in the extracting step;
generating, from the flicker component detected in the detecting step, a correction value to correct the flicker component; and
correcting the flicker component by applying the correction value generated in the generating step to the image signal of said one frame.

* * * * *